United States Patent

Bach

[15] 3,637,534
[45] Jan. 25, 1972

[54] POLYMERS FROM AROMATIC PRIMARY DIAMINES

[72] Inventor: Hartwig C. Bach, Pensacola, Fla.
[73] Assignee: Monsanto Company, St. Louis, Mo.
[22] Filed: July 9, 1969
[21] Appl. No.: 840,452

Related U.S. Application Data

[63] Continuation of Ser. No. 629,354, Apr. 10, 1967, abandoned, Continuation-in-part of Ser. No. 491,828, Sept. 30, 1965, abandoned.

[52] U.S. Cl. ..............................260/2 R, 96/115, 252/62.3, 260/29.2 N, 260/30.8 R, 260/47 R, 260/49, 260/63 R, 260/78 R, 260/79, 260/79.3 M, 260/80 M, 260/80 P
[51] Int. Cl. .........................................................C08g 33/02
[58] Field of Search ............................260/2, 47, 79, 79.3 M

[56] References Cited

UNITED STATES PATENTS 3,514,415   5/1970   Karol.........................................260/2

OTHER PUBLICATIONS

Kotlyarevskii et al., " Izvestia Akad. Nauk SSSR," Oct. 1964, pp. 1854– 60

Primary Examiner—Samuel H. Blech
Attorney—James W. Williams, Jr., Russell E. Weinkauf and John D. Upham

[57] ABSTRACT

Aromatic primary diamines are polymerized by an oxidative solution polymerization reaction using a cupric-cuprous redox couple complexed with a nitrogen base to give ordered polymers containing the azo linkage.

14 Claims, No Drawings

POLYMERS FROM AROMATIC PRIMARY DIAMINES

CROSS-REFERENCE TO RELATED APPLICATION

This is a continuation of application Ser. No. 629,354 which was filed Apr. 10, 1967 and is now abandoned. Application Ser. No. 629,354 was a continuation-in-part of application Ser. No. 491,828 which was filed on Sept. 30, 1965 and is now abandoned.

BACKGROUND OF THE INVENTION

Polymers containing azo linkages are well known in the prior art. Such polymers have been obtained by diazonium coupling of bis-diazonium salts with phenols, the polymers necessarily containing phenolic hydroxy groups in o- or p-position to the azo linkage and by treatment of aromatic diamines with free radicals such as the t-butoxy radical to produce azo polymers containing the radical as a randomly distributed substituent on the polymer chain. Polyaryl polymers have been obtained by decomposition of bisdiazonium salts and consist mainly of chains of aromatic rings with a random incorporation of some azo groups. The process of this invention provides azo polymers which are not restricted to those with specific substituents or a random distribution of azo groups in the chain.

SUMMARY OF THE INVENTION

Accordingly, it is an object of the present invention to provide a process for the polymerization of aromatic primary diamines. Another object is to provide an oxidative solution polymerization process for the preparation of ordered azopolymers and copolymers, terpolymers and interpolymers using as a catalyst a cupric ion complexed with a nitrogen base in the presence of an oxidant. Yet another object of the invention is to provide a process for the preparation of azopolymers containing an ordered distribution of azo groups in each regularly recurring structural unit. Other objects and advantages will become apparent from the detailed description of the invention.

DETAILED DESCRIPTION OF THE INVENTION

The oxidative solution polymerization process of the invention generally involves the oxidative coupling of aromatic primary diamines in which the amino groups to be oxidized are attached to an aromatic or heterocyclic ring utilizing a cupric ion complexed with a nitrogen base. Preferably, the oxidative solution polymerization process is conducted as a catalytic process with a cupric-cuprous redox couple complexed with a nitrogen base as the catalyst and molecular oxygen as the primary oxidant.

Under the stated reaction conditions essentially any aromatic primary diamine may be polymerized according to the process of the invention. These aromatic primary diamines are typically illustrated by the formula $$H_2N-Ar[X]_x-NH_2$$

wherein Ar represents an aromatic ring system, [X] represents a unit selected from 1. $(Y-Ar)_m$
2. $(Het)_n-Ar'$
3. $Z-Ar'Z-Ar'$ and 4. $Ar'-(Het)_n$ where Y is a nucleus connecting linkage, Ar is an aromatic ring system $m$ is an integer of from 0-2, Het is a multimember heterocyclic ring nucleus containing at least one hetero ring member selected from O, N and S, $n$ is an integer of from 1-2, Ar' is arylene, Z is an amide linkage, and $x$ is an integer of from 0 to any whole number provided such number is not great enough to prevent the polymerization reaction from occurring. The combination of Ar and $[X]_x$ gives an ordered structure. Thus $x$ is selected so as to provide a molecular weight of not above about 1,000. These aromatic primary diamines must have the diamine groups to be oxidized attached to an unsaturated carbocyclic ring. The term "aromatic ring" as used herein is intended to refer to any "ring system" which is of the benzene or heterocyclic type and arylene refers to single, multiple and fused benzene ring residues such as phenylene, biphenylene and naphthylene.

A preferred class of aromatic primary diamines are those characterized by the formula $$NH_2-Ar(Y-Ar)_m-NH_2$$

where Ar, Y and $m$ have the significance previously designated. Such diamines include, for example, m-phenylenediamine, p-phenylenediamine, o-phenylenediamine, 4,4'-diamino-biphenylene ether, 4,4'-diaminobiphenylmethane, 2,6-diaminopyridine, 2,7-diaminonaphthalene, 3,3'-diaminodiphenyl sulfone, 4,4'-diaminodiphenyl sulfide, 4,4'-diaminobiphenyl, 2,5-diamino-1,3,4-thiadiazole, 2,5-diamino-1,3,4-triazole, and the like. The nucleus connecting linkage designated as Y may be a valence bond, $-N=N-$, $-CONH-$, O, S, $-CH_2-$, $SO_2$, $-CO-$, $-COCO-$, $-CH=CH-$, and similar linkages.

Another class of aromatic primary diamines useful in the practice of the invention are those of the formula $$NH_2-Ar'(Het)_n-Ar'-NH_2$$

where Ar', Het and $n$ have the significance, previously indicated, and preferably where both Ar's are identical and Het is symmetrical.

These diamines include, for example, 2,5-bis(p-aminophenyl) 1,3,4-oxadiazole, 4,4'-bis (p-aminophenyl)- 2,2'-bithiazole, those containing benzthiazole, thiazolo-thiazole, benzimidazole, triazole and similar heterocyclic linkages between two amine terminated benzene aromatic groups.

Yet another illustrative class of useful diamines are those of the formula $$NH_2-Ar'-Z-Ar'-Z-Ar'-NH_2$$

where Ar' and Z are as previously indicated. Such diamines include, for example, N,N'-bis(n-aminophenyl)isophthalamide, N,N'-bis(m-aminophenyl)isophthalamide, N,N'-bis(m-aminophenyl)terephthalamide, N,N'bis(m-aminophenyl)bibenzamide, N,N'-bis(m-aminophenyl)isophthalamide, N,N'-bis(p-aminophenyl)terephthalamide and the like.

The aromatic primary diamines of the invention can have various substituents on the benzenoid or heterocyclic aromatic nuclei of the above formula. However, acid groups which are reactive with the catalyst or groups which are reactive in the sense of being oxidized by the catalyst are undesirable. For example, acid groups such as $-COOH$, $-SO_3H$ and the like and oxidizable groups such as $-SH$, phenolic hydroxyl ($>C-OH$),$-C=CH$, should not be present as ring substituents.

In the preferred operation of the invention the catalyst complex is formed from any cuprous or cupric salt which will form a complex with the nitrogen base and is capable of existing in the cupric state.

The oxidative solution polymerization reactive may be represented by the following sequence of steps:

Step 1. $NH_2-R-NH_2 + 4Cu^{II}(OH)Cl \times 2$ Pyridine $\rightarrow$ + $R-N=N-$ ] + $4Cu^{I}Cl \times Pyridine + 4H_2O$ Step 2. $4Cu^{I}Cl + 2H_2O + O_2 \xrightarrow{Pyridine} 4CU^{II}(OH)Cl \times 2$ pyridine $NH_2-R-NH_2 + O_2 \rightarrow$ + $R-N=N$ ]+ $2H_2O$ As shown it is believed that the aromatic diamine monomers are oxidized by the cupric ion complex and that the oxidant such as molecular oxygen or a precursor thereto primarily serves to reoxidize the cuprous ions to cupric ions.

In preparing the catalyst system comprising a cuprous or cupric salt and nitrogen base, the particular salt used has no effect on the type of product obtained. The only requirement for the salt is that it must form a complex with the nitrogen base that is soluble in the reaction medium, and must be capable of existing in the cupric state. The necessity for being able to exist in the cupric state is based on the belief that the oxidation of the amine monomer is accomplished by an intermediate formation of an activated cupric nitrogen base complex that reacts with the amine monomer to regenerate a cuprous nitrogen base complex. Typical examples of cuprous salts suitable for the process are cuprous chloride, cuprous bromide, cuprous sulfate, cuprous tetramine sulfate, cuprous acetate, cuprous propionate, cuprous palmitate, cuprous benzoate, etc. Cuprous chloride and cuprous bromide produce the highest molecular weight polymers. Cuprous salts such as cuprous iodide, cuprous sulfide, cuprous cyanide, cuprous thiocyanide, etc., are not suitable for use in the process since they are either not soluble in the nitrogen base or are not capable of existing as stable cupric salts. For example, cupric cyanide and cupric thiocyanate autogenously decompose to the corresponding cuprous salt. Cuprous nitrate and cuprous fluoride are not known to exist but the amine complexes can be made in situ. The use of cupric salts is generally less desirable in the catalyst preparation although cupric acetate is quite effective.

Since the reaction does not destroy the catalyst, only a small catalytic amount of cuprous or cupric salt needs to be used, from about 0.1 to 10 mol percent, based on the moles of aromatic diamine to be oxidized although larger amounts can be used, is desired.

The nitrogen bases which may be used as a component of the catalyst as well as the reaction medium include all nitrogen bases except those which are oxidized by the catalyst. It is preferred to have the basicity of the nitrogen base as close as possible to that of the primary diamine to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylbenzamide, dimethylpropionamide, diethylacetamide, N-acetylpyrrolidine, N-methyl-α-pyrrolidone, N-ethyl pyrrolidone, and the like. Dimethylacetamide and hexamethylphosphoramide are preferred.

Other nitrogen bases include the aliphatic tertiary amines such as triethyl amine, tributyl amine, diethylmethyl amine, allyldiethyl amine, dimethyl-n-butyl amine, diethylisopropyl amine, benzyldimethyl amine, dimethylcyclohexyl amine, 1-dimethylamino-4-pentene, etc. When aliphatic tertiary amines are used, it is preferred that at least two of the aliphatic groups be straight chain hydrocarbon groups.

Examples of cyclic amines are the pyridines, such as pyridine itself, the n-alkyl piperidines, the quinolines, the isoquinolines, the N-alkyl tetrahydroquinolines, the N-alkyl tetrahydroisoquinolines, the N-alkyl morpholines, etc., including the ring-substituted products of these cylic amines, whereby one or more of the hydrogen atoms on the carbons forming the ring are substituted by groups which may be alkyl (for example, methyl, ethyl, propyl, butyl, amyl, hexyl, heptyl, octyl, etc., and isomers and homologs thereof,) alkoxy (for example, methoxy, ethoxy, propoxy, butoxy, etc., and isomers and homologs thereof,) aryl (for example, phenyl, tolyl, dimethylphenyl, chlorophenyl, bromotolyl, naphthyl, chlorobromonaphthyl, etc., and isomers and homologs thereof,) aryloxy (for example phenoxy, toloxy, xyloxy, chlorophenoxy, naphthoxy, etc., and isomers and homologs thereof) and the like. The ring substituents may be the same or different hydrocarbon groups. It is understood that when piperidines, tetrahydroquinolines, and tetrahydroisoquinolines are used, they are tertiary amines whereby an alkyl hydrocarbon radical such as those listed above for the ring substituents is also attached to the amine nitrogen group.

Mixtures of the bases which form a part of the catalyst system may also be used. They may be used in combination with compounds which act only as the reaction medium. For example, nitrobenzene is a good reaction medium. Other inert solvents which do not interfere with the catalyst or are not oxidized to any appreciable extent by it may also be used as the reaction medium. For example, pyridine can be used as the sole solvent, or a mixture of pyridine and dimethylacetamide can be employed in the polymerization mixture.

In a preferred mode of operation of the process of the invention molecular oxygen is used as the primary oxidant and may be introduced into the reaction medium by diffusion or injection, although it is possible to conduct the reaction in the absence of any oxygen provided sufficient cupric ions are present. Either 100 percent oxygen or gas mixtures containing oxygen may be used.

The oxidation and thus polymerization of the diamines of the invention is related to their basicity, the more basic the amino groups are the higher the rate of their catalytic oxidation to azopolymers becomes. Thus it is more difficult to oxidize diamines which carry electronegative substituents on the aromatic nucleus to which the amino groups to be oxidized are attached. Such electronegative groups are, for example, carbonyl, ester or nitro groups.

Using the process of the invention it is possible to prepare polymers useful in the field of thermal resistance, semiconducting or photochromic materials.

The invention is further illustrated by the following examples in which all parts and percents are by weight unless otherwise indicated. Inherent viscosity in each example is determined by dissolving 0.5 g. of polymer in 100 ml. of the specified solvent and measuring reaction flow time at 30° C.

EXAMPLE I

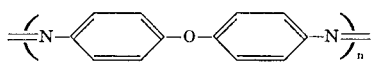

A 0.5 g. portion of cuprous chloride was oxidized with oxygen in a mixture of 30 ml. of pyridine and 20 ml. of nitrobenzene. Then 2.0 g. (0.01 mole) of 4,4'-diaminodiphenyl ether were added. In 3 hr. 30 min. at ambient temperature, a total of 265 ml. of $O_2$ (25° C.) (theory: 244 ml. at 25° C.) was absorbed by the mixture. The polymer was coagulated in 300 ml. of methanol. A brown material (2.01 g.) was obtained. Inherent viscosity (conc. $H_2SO_4$) of the polymer: 0.53. A film was cast from conc. $H_2SO_4$.

EXAMPLE II

Cuprous chloride (0.25 g.) was oxidized with oxygen in 25 ml. of hexamethyl phosphoramide (HPT). Then, 1.0 g. (0.005 mole) of 4,4'-diaminodiphenyl ether was added. The mixture was held for 60 min. at 25° C., heated to 61° C. for 95 min. In 235 min. total reaction time 119 ml. of $O_2$(25° C.) were absorbed (theory: 122 ml. of $O_2$ at 25° C.) Some films were cast from the viscous dope. Inherent viscosity (HPT): 0.61.

EXAMPLE III

Cuprous chloride (0.5 g.) was oxidized with oxygen in a mixture of 30 ml. of pyridine and 20 ml. of nitrobenzene. Then, 2.0 g. (0.01 mole) of 4,4'-diaminodiphenyl ether was added. The reaction mixture absorbed 265 ml. of $O_2$ in 210 min. at 25° C. with intermittent heating to 80° C. By coagulation, 2.0 g. of a brown polymer was obtained. Inherent viscosity (conc. $H_2SO_4$): 0.53.

EXAMPLE IV

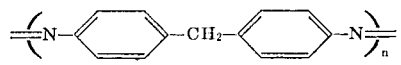

A 0.5 g. portion of cuprous chloride was oxidized with oxygen in 50 ml. of pyridine. Then, 3.96 g. (0.02 mole) of 4,4'-diaminodiphenylmethane were added. In 3 hours 25 min., the reaction mixture absorbed a total of 500 ml. of $O_2$(25° C.) (theory: 489 ml. at 25° C.); for the first 83 min. the temperature was kept a 25° C., then raised to 65° C. On coagulation in methanol, a brown material was obtained. Inherent viscosity (conc. $H_2SO_4$) of the polymer: 0.33. A self-supporting film was cast from conc. $H_2SO_4$.

EXAMPLE V

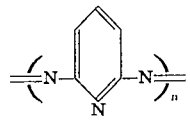

A 0.5 gram portion of cuprous chloride was oxidized with oxygen in 30 ml. of pyridine. Then, 1.09 g. (0.01 mole) of 2,6-diaminopyridine was added. The reaction mixture was stirred in oxygen atmosphere for 170 min. at room temperature, then for 180 min. at 50°–57° C. A total of 171 ml. of $O_2$ (25° C.) was absorbed (theory: 244 ml. at 25° C.) By evaporation of the mixture and treatment of the residue with conc. $NH_4OH$ a black solid was obtained. Inherent viscosity (conc. $H_2SO_4$) 0.09.

EXAMPLE VI

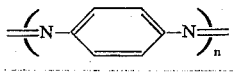

A 0.5 gm. portion of cuprous chloride was oxidized with oxygen in a mixture of 10 ml. of pyridine and 40 ml. of dimethylacetamide (DMAc). Then, 1.08 g. (0.01 mole) of p-phenylenediamine was added. The reaction mixture was held 55 min. at 25° C., 5 hrs. 25 min. at 50°–56° C. A total of 258 ml. of $O_2$(25° C.) was absorbed, (theory: 244 ml. at 25° C.). By filtration, 1.1 g. of a black solid was isolated. Inherent viscosity (conc. $H_2SO_4$) of the polymer: 0.21.

EXAMPLE VII

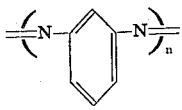

A 0.5 gm. portion of cuprous chloride was oxidized with oxygen in a mixture of 10 ml. of pyridine and 40 ml. of DMAc. Then, 1.08 g. (0.01 mole) of m-phenylenediamine was added. In 4 hr. at 25° C., a total of 245 ml. of $O_2$ was absorbed (theory: 244 ml. at 25° C.) On evaporation of the reaction mixture and treatment of the residue with conc. $NH_4OH$, a black polymer was obtained.

EXAMPLE VIII

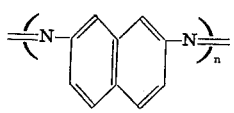

A 0.3 g. portion of cuprous chloride was oxidized with oxygen in a mixture of 10 ml. of pyridine and 40 ml. of DMAc. Then 0.79 g. of 2,7-diaminonaphthalene was added. In 3 hr. 20 min. 146 ml. of $O_2$(25° C.) were absorbed at 25° C. (theory: 122 ml. at 25° C.) On coagulation in water, a black material was obtained. Inherent viscosity (conc. $H_2SO_4$) 0.08.

EXAMPLE IX

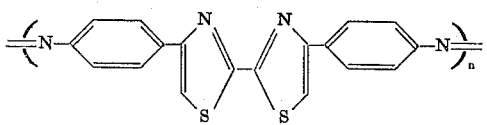

A 0.3 g. portion of cuprous chloride was oxidized with oxygen in a mixture of 20 ml. of pyridine and 15 ml. of dimethylacetamide (DMAc.) Then 0.7 g. of 4,4'-bis(p-aminophenyl)-2,2'-bithiazole was added. Oxidation was continued for 3 hr. at 25° C., 2 hr. at 60° C. 51.2 ml. of $O_2$(25° C.) were absorbed (theory: 49 ml. of $O_2$ at 25° C.) The mixture was coagulated in 210 ml. of methanol. The polymer was filtered off, washed with methanolic HCl and dried at 100° C. in vacuo. 0.67 g. of orange-red material was obtained. Inherent viscosity (conc. $H_2SO_4$) of the polymer: 0.44. A self-supporting film was cast from conc. $H_2SO_4$.

EXAMPLE X

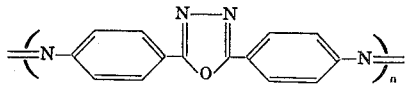

A 0.5 g. portion of cuprous chloride was oxidized with oxygen in a mixture of 10 ml. of pyridine and 40 ml. of DMAc. Then 1.25 g. (0.005 mole) of 2,5-bis(p-aminophenyl)-1,3,4-oxadiazole was added. In 13 hr. at temperatures up to 79° C. a total of 98 ml. of $O_2$ (25° C.) was absorbed. The polymer was coagulated in 300 ml. of $H_2$. Inherent viscostiy (conc. $H_2SO_4$) of the polymer: 0.14.

EXAMPLE XI

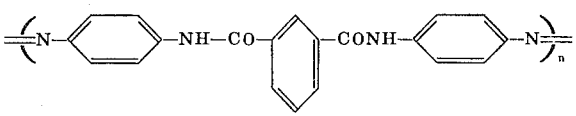

A 0.5 g. portion of cuprous chloride was oxidized with oxygen in a mixture of 20 ml. of pyridine and 30 ml. of dimethylacetamide (DMAc.) Then 3.46 g. (0.01 mole) of N,N'-bis(p-aminophenyl)isophthalamide were added. In 40 min. at 25° C., a total of 248 ml. $O_2$ was absorbed by the mixture (theory: 244 ml. $o_2$ at 25° C.) A significant viscosity increase was observed during the polymerization. A film was cast from the dope. By coagulation in water, a dark-brown polymer was isolated. Inherent viscosity (conc. $H_2SO_4$) of the polymer: 2.08. Films of this composition remained flexible when heated at 300° C. in air for 90 hr.

EXAMPLE XII

Cuprous chloride (0.25 g.) was oxidized with oxygen in 25 ml. of hexamethyl phosphoramide (HPT). Then, 1.73 g. (0.005 mole) of N,N'-bis(p-aminophenyl)isophthalamide was added. The mixture was stirred in oxygen for 130 min. A film was cast from the dope. Inherent viscosity: 0.56.

EXAMPLE XIII

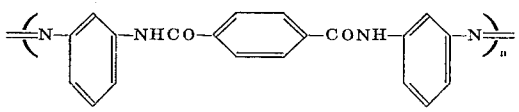

A 0.25 g. portion of cuprous chloride was oxidized with oxygen in a mixture of 5 ml. of pyridine and 10 ml. of DMAc. Then, 1.73 g. (0.005 mole of N,N'-bis(m-aminophenyl)terephthalamide and 5 ml. of pyridine were added. In 4 hr. 45 min. at 55°–60° C., a total of 122 ml. $O_2$(25° C.) (theory: 122 ml. $O_2$) was absorbed by the mixture. The polymer was isolated by coagulation in water. Inherent viscosity (conc. $H_2SO_4$) of the polymer: 0.4.

EXAMPLE XIV

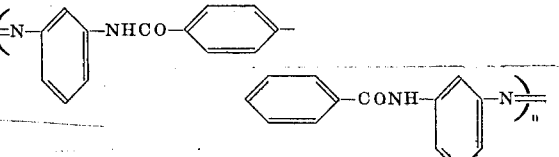

A 0.25 g. portion of cuprous chloride was oxidized with oxygen in a mixture of 10 ml. of pyridine and 40 ml. of DMAc. Then, 0.84 g. (0.002 mole) of N,N'-bis(m-aminophenyl)bibenzamide was added. The mixture was held 45 min. at 25° C., then 170 min. at 50°–56° C. A total of 47 ml. $O_2$(25°

C.)(theory: 49 ml. $O_2$ at 25° C.) was absorbed. On coagulation in $H_2O$ 0.78 g. of a dark-brown material was obtained. Inherent viscosity (conc. $H_2SO_4$) of the polymer: 0.25.

EXAMPLE XV

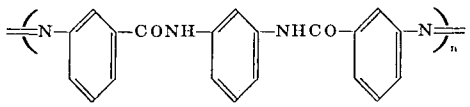

A 0.3 g. portion of cuprous chloride (0.3 g.) was oxidized with oxygen in 30 ml. of pyridine. Then, 6.92 g. of N,N'-m-phenylenebis (m-aminobenzamide) was added. The reaction mixture was stirred for 2 hr., 15 min. at 25° C., then for 3 hr., 5 min. at 70° C. A total of 370 ml. of $O_2(25°$ C.) were absorbed. The light-brown polymer was isolated by coagulation in water. Yield: 6.04 g.; inherent viscosity (conc. $H_2SO_4$) 0.15.

EXAMPLE XVI

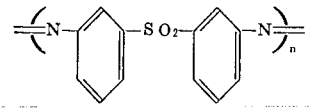

A 0.25 g. portion of cuprous chloride was oxidized with oxygen in 20 ml. of pyridine. Then, 0.62 g. (0.0025 mole) of 3,3'-diaminodiphenyl sulfone was added. The reaction mixture was stirred at 80°–90° C. in oxygen atmosphere for 20 hr. 30 min. A total of 61 ml. of $O_2(25°$ C.) was absorbed (theory: 61 ml. at 25° C.) On coagulation in conc. $NH_4OH$, a brown material was obtained. Inherent viscosity (conc. $H_2SO_4$) of the polymer: 0.11.

EXAMPLE XVII

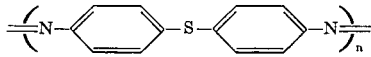

A 0.5 g. portion of cuprous chloride was oxidized with oxygen in a mixture of 10 ml. of pyridine and 40 ml. of dimethylacetamide. Then, 2.16 g. (0.01 mole) of 4,4'-diamino-diphenyl sulfide were added. The reaction mixture was stirred in oxygen atmosphere for 75 min. at room temperature, then for 200 min. at 58°–64° C. A total of 233 ml. of $O_2(25°C.)$ was absorbed (theory: 244 ml. at 25° C.) On coagulation in water, a light-brown polymer was obtained. Inherent viscosity (conc. $H_2SO_4$) of the polymer: 0.18.

I claim:

1. A process for preparing a polymer having recurring azo linkages in the polymer chain which comprises contacting an aromatic diprimary diamine with oxygen in a reaction medium comprising a cupric ion-nitrogen base catalyst complex that is soluble in the reaction medium and in which the nitrogen base is an amide not oxidized by said catalyst complex.

2. The process of claim 1 wherein the diamine is 4,4'-diaminodiphenyl ether, p-phenylenediamine, N,N'-bis(p-amino-phenyl)isophthalamide, N,N'm-phenylenebis(m-aminobenzamide) or 4,4'-bis(p-aminophenyl)-2,2'-bithiazole.

3. The process of claim 1 wherein the nitrogen base is dimethylacetamide, hexamethylphosphoramide or dimethylformamide.

4. The process of claim 1 wherein the nitrogen base is a phosphoramide, a carbonamide or a sulfonamide.

5. The process of claim 1 wherein the complex is formed by oxidation of a cuprous salt in a nitrogen base.

6. A process for preparing a polymer having recurring azo linkages in the polymer chain which comprises contacting an aromatic diprimary diamine represented by the formula
$$NH_2—Ar—X—NH_2$$
wherein Ar is a divalent aromatic ring system and X is a valence bond or a divalent radical selected from the group consisting of

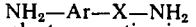

+Y—Ar+m,
+Het+ Ar—and
—Z—Ar'—Z—Ar'— in which Y is a valence bond or a divalent linking radical selected from the group consisting of —N=N—, —CONH—, —$SO_2$—, —CO—, —CO—CO— and —CH=CH—; m is 1 or 2; +Het+ is a divalent heterocyclic radical having a molecular weight of less than 1,000 and containing at least one hetero atom selected from the group consisting of O, S and N; Ar' is an arylene radical; and Z is an amide linkage with oxygen in a reaction medium comprising a cupric ion-nitrogen base complex that is soluble in the reaction medium.

7. The process of claim 6 wherein the diamine is N,N'-bis(p-aminophenyl)isophthalamide or N,N'-m-phenylenebis(m-aminobenzamide).

8. The process of claim 6 wherein the nitrogen base is pyridine, dimethylacetamide, hexamethylphosphoramide, dimethylformamide or 2-methylpyridine.

9. The process of claim 6 wherein the complex is formed by oxidation of a cuprous salt in a nitrogen base.

10. A process for preparing a polymer having recurring azo linkages in the polymer chain which comprises contacting an aromatic diprimary diamine represented by the formula
$$NH_2—Ar—X—NH_2$$
wherein Ar is a divalent aromatic ring system and X is a valence bond or a divalent radical selected from the group consisting of

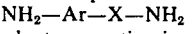

+Y—Ar+,
+Het+ Ar—and
—Z—Ar'—Z—Ar'— in which Y is a valence bond or a divalent linking radical selected from the group consisting of —CONH—, —$SO_2$—and —CO—; +Het+ is a divalent heterocyclic radical having a molecular weight of less than 1,000 and containing at least one hetero atom selected from the group consisting of O, S and N; Ar' is an arylene radical; and Z is an amide linkage with oxygen in a reaction medium comprising a cupric ion-nitrogen base complex that is soluble in the reaction medium.

11. The process of claim 10 wherein the diamine is p-phenylene diamine or 4,4'-bis(p-aminophenyl)-2,2'-bithiazole.

12. The process of claim 10 wherein the diamine is o-phenylene diamine.

13. The process of claim 10 wherein the nitrogen base is pyridine, dimethylacetamide, hexamethylphosphoramide, dimethylformamide or 2-methylpyridine.

14. The process of claim 10 wherein the complex is formed by oxidation of a cuprous salt in a nitrogen base.

* * * * *